United States Patent [19]

Mailleux et al.

[11] Patent Number: 4,778,330
[45] Date of Patent: Oct. 18, 1988

[54] ELEVATOR DEVICE FOR AN AGRICULTURAL TRACTOR LOADER

[76] Inventors: Louis M. J. Mailleux; Andre A. Mailleux, both of 19 rue de Rennes, 35690 Acigne, France

[21] Appl. No.: 844,202

[22] Filed: Mar. 26, 1986

[51] Int. Cl.[4] .............................................. B66F 9/16
[52] U.S. Cl. ...................................... 414/629; 294/107;
414/24.5; 414/648; 414/652; 414/696; 414/728;
414/739; 414/742
[58] Field of Search ....................... 414/24.5, 628, 629,
414/641, 642, 648, 650, 652, 655, 686, 692, 696,
721, 728, 739, 742, 718; 294/107

[56] References Cited

U.S. PATENT DOCUMENTS

| | | | |
|---|---|---|---|
| 2,468,201 | 4/1949 | Hoover | 414/742 X |
| 2,622,915 | 12/1952 | Horn | 294/107 X |
| 3,593,867 | 7/1971 | Moe | 414/742 X |
| 3,854,609 | 12/1974 | Cox | 294/107 X |
| 3,899,094 | 8/1975 | Youl | 414/739 |

FOREIGN PATENT DOCUMENTS

| | | | |
|---|---|---|---|
| 1057040 | 10/1953 | France | 414/696 |
| 2478610 | 9/1981 | France | 414/24.5 |

Primary Examiner—Leslie J. Paperner
Attorney, Agent, or Firm—Browdy and Neimark

[57] ABSTRACT

The elevator device for an agricultural tractor loader comprises a swing member bearing in an articulated manner on a member protruding from a bracket in direction of the tractor loader. The swing member is moreover supported and actuated by a cylinder connected to the bracket so that this swing member pivots the tool to which it is attached and lifts the tool during expansion of the cylinder.

5 Claims, 7 Drawing Sheets

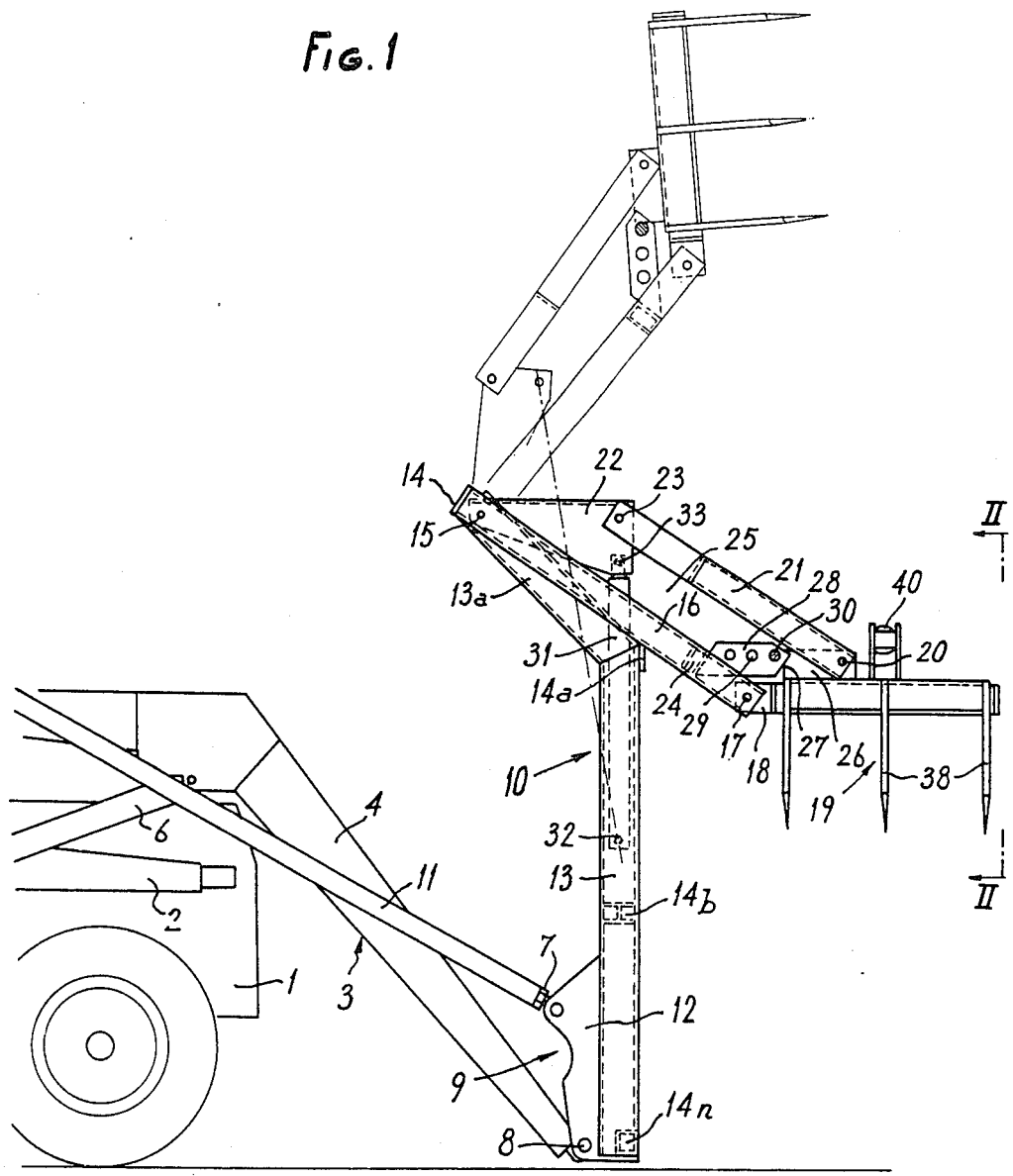

Fig. 4

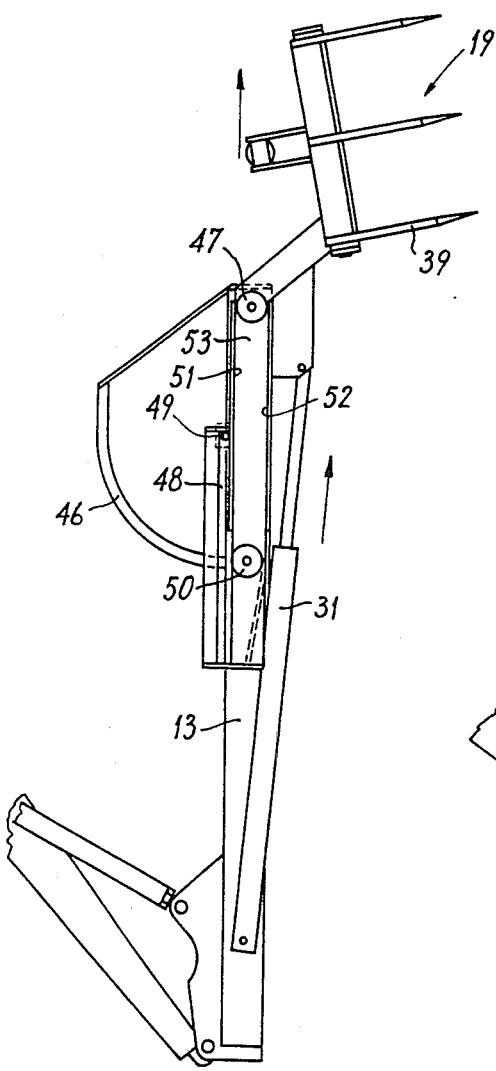
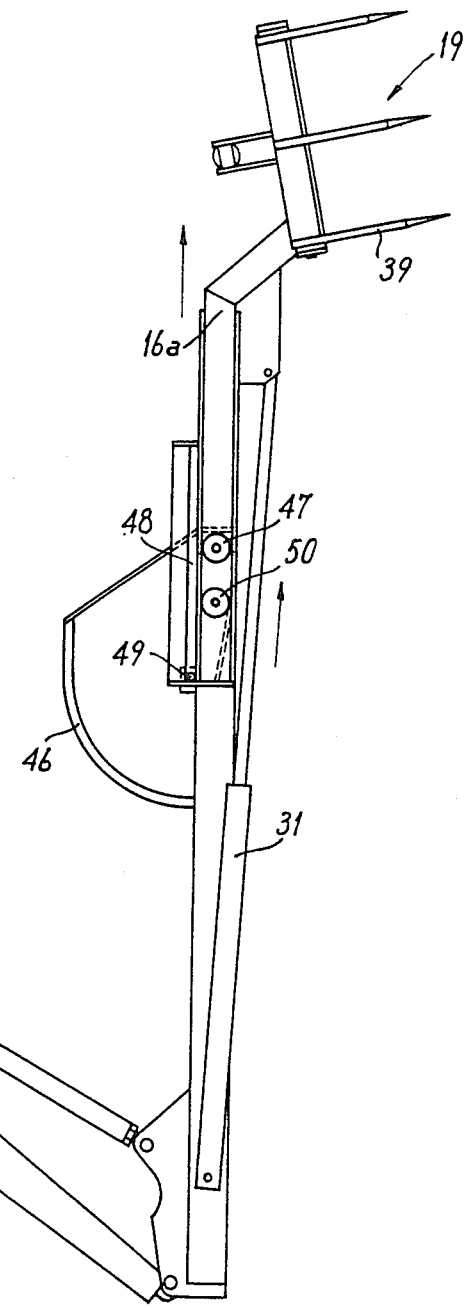

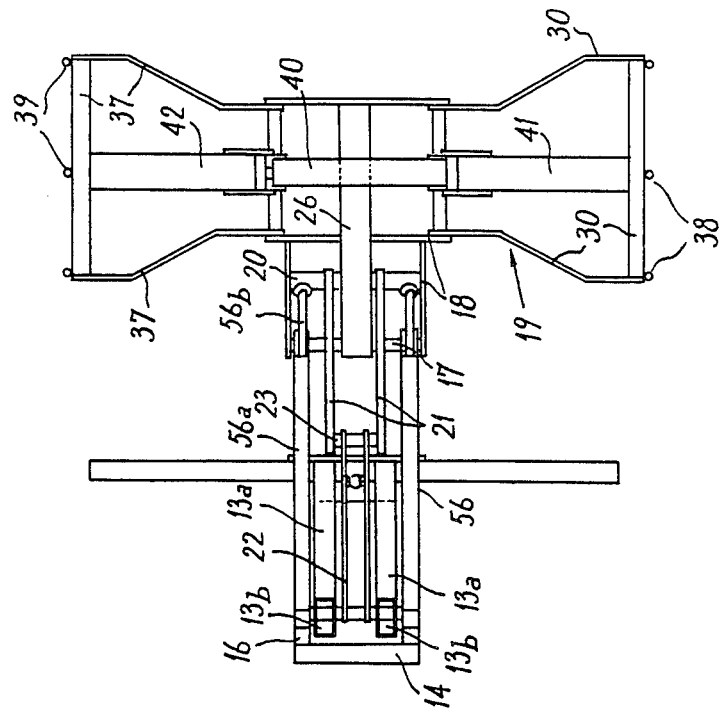
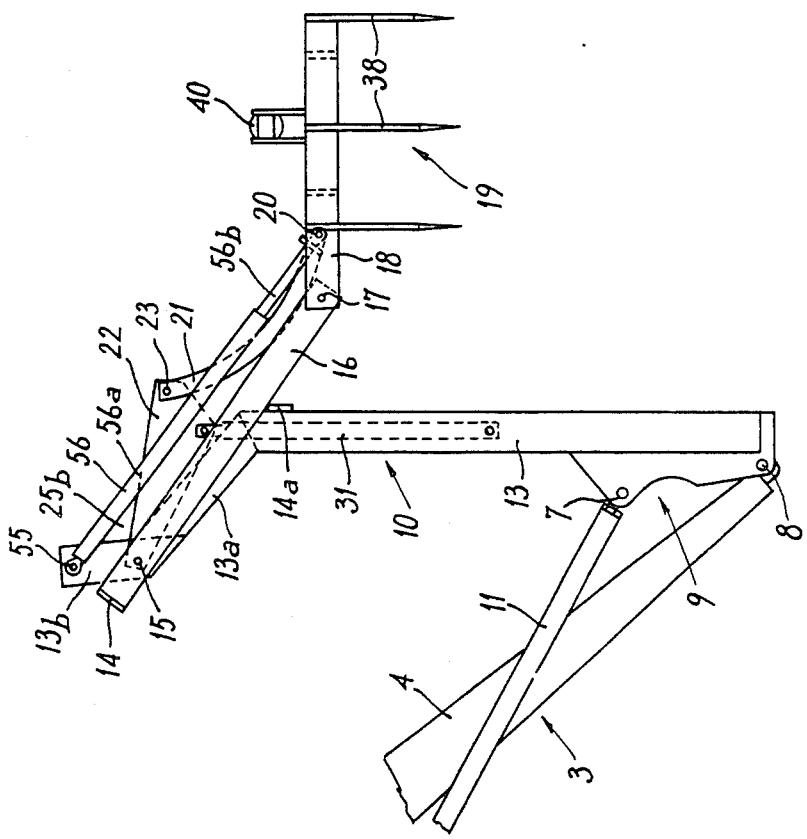

ELEVATOR DEVICE FOR AN AGRICULTURAL TRACTOR LOADER

FIELD OF THE INVENTION

The present invention relates to a new elevator device for agricultural tractor loaders.

It is usual in the art to have agricultural tractors or similar vehicles fitted with removable loaders at the end of which can be mounted various tools, such as buckets, forks or similar.

BACKGROUND OF THE INVENTION

Many embodiments of elevator devices are also known which include gripping tools and which are mounted at the end of the loader of a tractor.

These elevator devices are used particularly for the handling of fodder and straw bales, whether of cylindrical or parallelepipedal shape.

The bales made are more or less heavy are require, consequently, the use of a mechanical equipments for their transportation and their storage under sheds.

When gripping tools are directly mounted at the end of a loader, the stroke at the disposal of the user is relatively short, thereby preventing stacking the bales or other objects over a sufficient height.

When an additional elevator device is mounted at the end of the loader, the load formed by the bale or another article follows frequently a path of travel which increases considerably the overhang length, and which requires to provide the tractor with compensation ballast.

In addition, the known loading devices are often not very strong and resist poorly to twisting or warping efforts to which they can be subject if, inadvertently, the operator hits the framework of a shed during handling of a bale and when the loader is in a high position.

Problems arise also when picking the bale from the ground, particularly when a pivoting motion has to be imparted to the bale or other articles, as this can happen when cylindrical bales are concerned or for handling drums or casks.

OBJECT OF THE INVENTION

The present invention solves the hereabove exposed problem by providing an elevator device which does not increase substantially the overhang length with respect to that of the loader and which maintains the overhang length constant or reduces it progressively as the load is being lifted.

SUMMARY OF THE INVENTION

According to the invention, the elevator device for an agricultural tractor loader, which is mounted in lieu of a tool which the loader usually comprises and includes at least one bracket for the support of at least one mobile member connected to a tool, comprises a swing member bearing on a member protruding from the bracket in direction of the tractor loader, the swing member being moreover supported and actuated by cylinder means connected to the bracket so that the swing member pivots the tool to which it is attached and lifts the tool during expansion of the cylinder means.

Various other features of the invention are moreover apparent from the following detailed description.

BRIEF DESCRIPTION OF THE DRAWINGS

Embodiments of the invention are shown, by way of non limiting examples, in the accompanying drawings, wherein:

FIG. 1 is a partly schematic view of the elevator device for an agricultural tractor loader made according to the invention;

Figure 4:
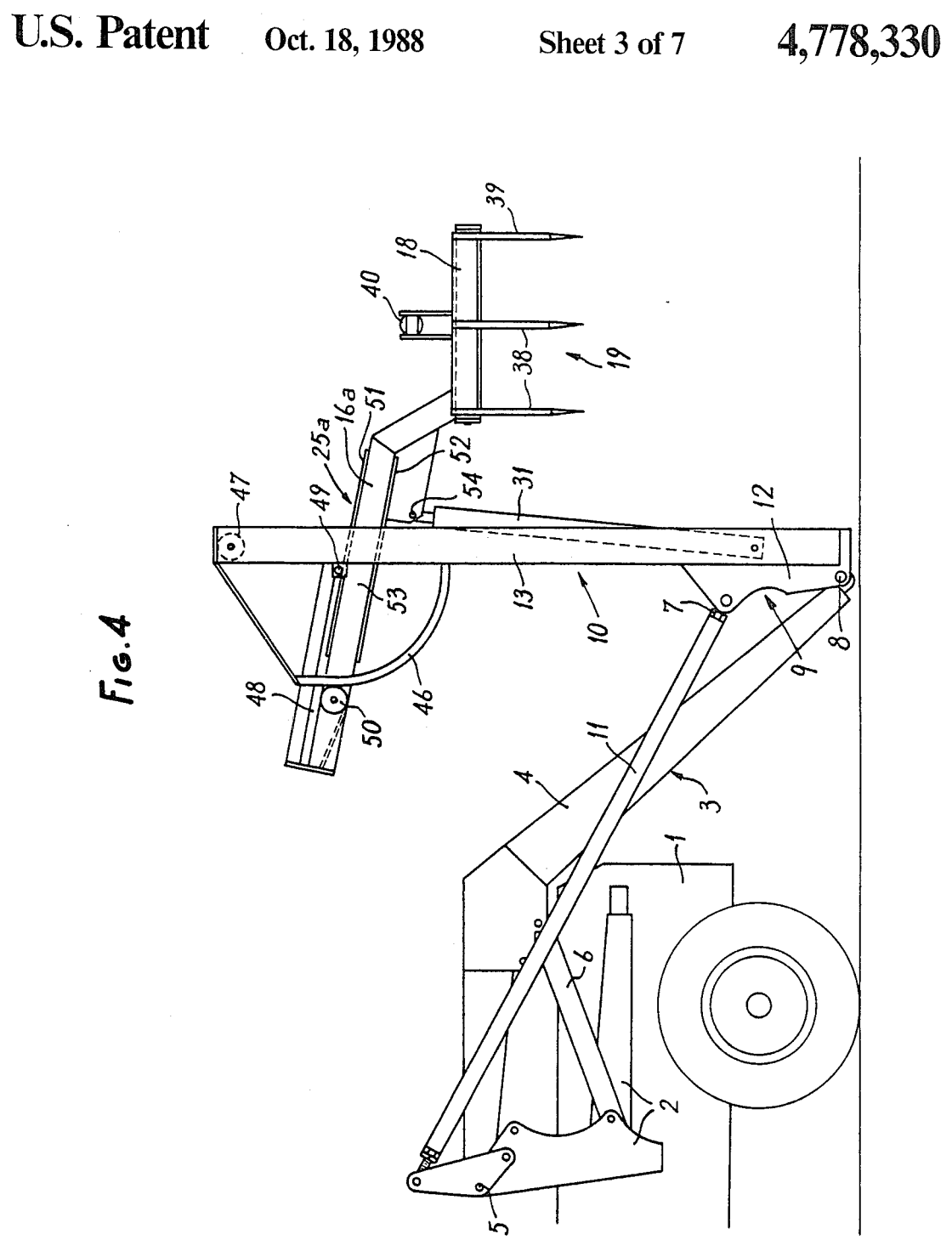

FIG. 4 is an elevation view similar to FIG. 1 of an alternative embodiment;

FIGS. 5, 6 and 7 are elevation views illustrating some working characteristic states;

FIG. 8 is an elevation view similar to FIG. 1 of another alternative embodiment;

FIG. 9 is a plan view, as viewed from above, corresponding to FIG. 8;

Figure 3:
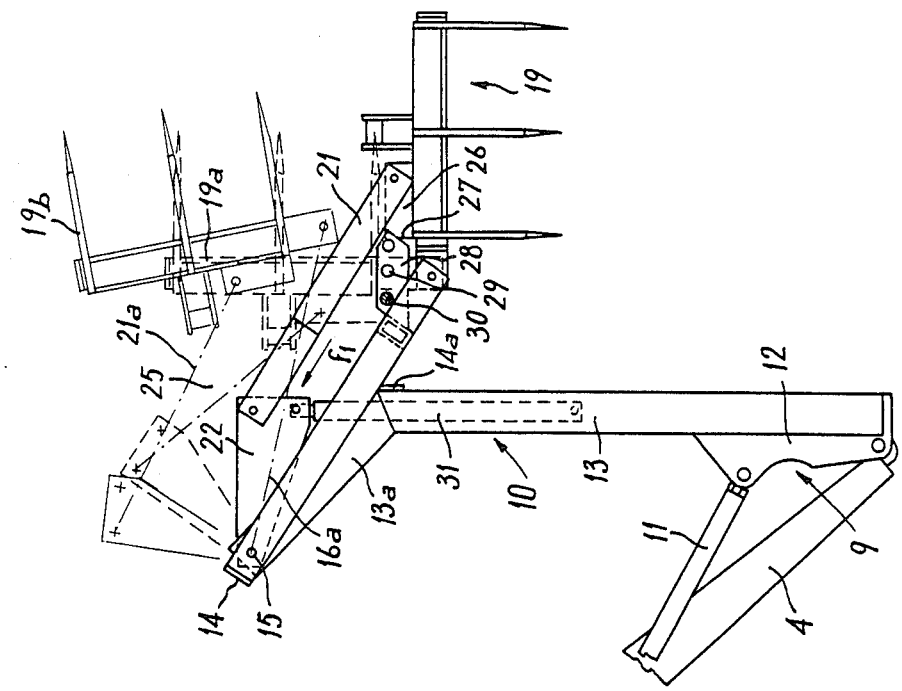
FIG. 3 is an elevation view similar to FIG. 1, illustrating some characteristic states of the elevator device.

In the drawings, 1 designates an agricultural tractor which comprises, on both its lateral sides, supports 2 for a loader generally designated by 3. The loader 3 can, for example, comprise two arms 4, of which one only is shown in the drawings, these arms being articulated on a pin and being liftable by means of cylinders 6.

The arms 4 of the loader 3 are connected, for example via fixed or extensible blocks 7, 8, to a hitch 9 which is interchangeable and which is a part of an accessory to be connected to the loader, which accessory can be a bucket or, as in the case of the subject of the present invention, the accessory is an elevator device generally designated by 10.

In order that the hitch 9 is always maintained substantially vertical, the loader 3 comprises suitable means, for example connecting rods 11 disposed on either side of the arms 4 and attached to the support 2. The foregoing disclosure is only given by way of example since the loaders can have extremely different configurations.

The hitch 9 is made of a frame, for example a rectangular frame, from which protrude flanges 12 attached to the arms 4 and to the connecting rods 11. The frame forming the hitch 9 forms also brackets 13, of which one only is shown in the drawings, these brackets being connected together by cross-members 14, 14a, 14b, . . . 14n.

In the embodiment of FIGS. 1 and 3, the brackets 13 have a slanting segment 13a, forming for example an angle of 45° to the horizontal and oriented toward the tractor 1. Each of the brackets 13 is connected by a fulcrum 15 articulated to connecting rods 16, of which one only is shown in the drawings. The connecting rods 16 are, on the other hand, articulated on pins 17 carried by the frame 18 of a tool 19 which, in the example shown, is a tine gripping assembly.

The frame 18 is also connected by pins 20 to two connecting rods 21 (FIGS. 1 and 2), the head of which is articulated to a rocking lever 22 by means of pins 23. The connecting rods 16 and 21 comprise connecting cross-members 24 for forming rigid frames able to resist twisting efforts when the tool 19 is loaded and when the connecting rods forming a swing 25 with the rocking lever 22 are displaced, as explained hereafter.

The pins 20 of the connecting rods 21 are supported by flanges 26 connected together for forming an abutment 27.

The connecting rods 16 support a mobile brace 28 which, in the embodiment shown, is made of iron fittings pierced with holes 29 for positioning spindles 30 which can occupy each time one of the three positions shown in FIGS. 1 and 3. The mobile brace could also be in the shape of a screw abutment or of a cylinder.

For handling the swing 25, a cylinder 31, preferably of the double action type, is mounted between the brackets on a pin 32, and the cylinder 31 is, on the other hand, connected by means of a second pin 33 to the rocking lever 22.

Figure 2:
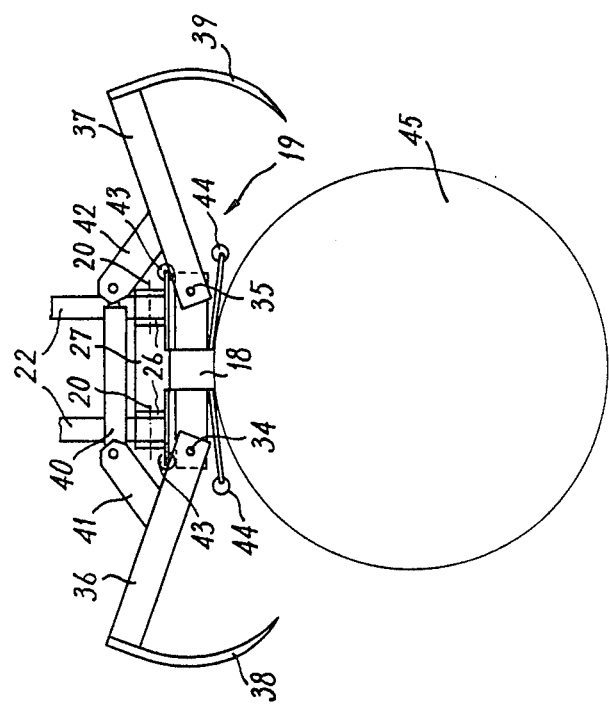
FIG. 2 is a schematic partial elevation view of a mobile tine assembly of the device of FIG. 1 as seen along line II—II of this figure.

When the tool is made as shown in FIG. 2 by a gripping assembly, for example for fodder bales or trusses, the frame 18 supports pins 34, 35 on which are articulated support arms 36, 37 for tines 38, 39. The arms 36, 37 are connected together by a hydraulic cylinder 40 articulated on lugs 41, 42 provided on the arms 36, 37.

The frame 18 includes, on the other hand, end of travel abutments 43, 44 placed on either side of the arms 36, 37. The radius of curvature of the tines 38, 39 corresponds to the useful length of the arms 36, 37 in order that said abutments can drive into the fodder bales without damaging them.

The device operates in the following manner:

At rest, the connecting rods 16 bear on the crossmember 14a. To begin with, it is assumed that the spindles 30 are within the hole 29 the nearest from the connecting rods 21, as shown in FIG. 1. By operating the cylinder 31, the cylinder 29 lifts the rocking lever 22. The spindles 30 being against the abutment 27 of the frame 18, the angle formed by the connecting rods 16 and 21 with the frame 18 cannot be modified. Consequently, the assembly tilts progressively as the cylinder moves up in order to occupy the position shown in thin lines at top portion of FIG. 1, position for which the tool 19 has been pivoted as a whole over an angle slightly greater than 90°.

As shown in the drawings and since the brackets form a slanting segment 13a facing the tractor 1, the connecting rods 16 and 21 of the swing 25 can be long without resulting in an important overhang length for the tool 19, and consequently the tool 19 can support a heavy load.

During the lifting and tilting motion of the swing 25 and tool 19 assembly, the overhang length is still reduced, which makes that the tractor 1 is not unbalanced.

When it is not required that the elevator device has an upward stroke as important, the spindles 30 are placed in the intermediate hole 29 or in the other end hole, as shown by FIG. 3. In this case, when the cylinder 31 is being lifted, the pivoting motion of the rocking lever 22 first drives the connecting rods 21 in the direction of arrow f1, which has for its effect to tilt the tool 9 to the position 19a for which this tool is pivoted over an angle of 90° before the abutments 27 come in engagement with the spindles 30. If the cylinder 31 is pivoted further, there is an extra tilting motion of the swing 25, the connecting rods of which occupy the positions 16a and 21a for which the tool is in the position 19b.

FIG. 3 shows clearly that the overhang length is permanently reduced during the motion of the swing 25, which is favorable for lifting heavy loads.

The tool 9 is as such controlled only by the cylinder 40.

In the position shown in FIG. 3, the arms 37 maintain the tines 38, 39 spread apart in their maximum position since the arms 37 are bearing against the abutments 43 (FIG. 2).

Assuming the tool should have to grip the bale shown at 45, the cylinder 40 is fed and, consequently, pivots the arms 36, 37. The tines 38, 39 penetrates into the bale 45 and makes a motion according to an arc of a circle so that the bale 45 is well maintained while bearing against the bottom of the frame 18. The penetration motion of the tines 38, 39 is limited by the abutments 44.

When the bale 45 has been transported and is deposited either on one of its top and bottom bases or on one of its side generating lines, the cylinder 40 is retracted, which has for its effect to make the tines 38, 39 to come out, and they execute exactly the same motion as that which they previously performed for gripping the bale. It follows therefrom that the bale 45 is not displaced during the extraction of the tines, and this all particularly since the bale 45 is maintained against the bottom of the frame 18.

The opening motion of the tines 38, 39 is limited, as hereabove explained, by the abutments 43, whereby there is no risk that the tines of one of the arms 36, 37 will remain engaged in the bale 45, as this could be the case if the motion of the tines was not limited or if their control was not mutually dependent.

FIGS. 4 to 7 illustrate an alternative embodiments in which the brackets 13 do not include a slanting segment, as the segment 13a, but circular sectors 46 facing rearwardly, that is to the front of the tractor 1, in the same manner as the slanting segment 13a hereabove described.

In their upper portion and on their side which is facing one another, the brackets 13 are provided with a pulley 47 the function of which will appear herebelow with reference to FIGS. 6 and 7.

The circular sectors 46 extend up to the brackets 13 by protruding on the inner side of the latter. A swing 25a, which fills the function of the swing 25 of FIGS. 1 and 3, is made of a frame including two parallel connecting rods 16a which can slide and pivot. The connecting rods 16a are mounted between the two brackets 13 and define an opening 48 through which passes a pulley 49 carried by the brackets 13. Each of the connecting rods 16a includes, moreover, a roller 50 for following the corresponding circular sector 46.

The side of the connecting rods 16a which is facing each bracket comprises side plates 51, 52 forming therebetween a hollow rail 53, the width of which exceeds slightly or is equal to the diameter of the pulley 47 carried by the upper portion of the brackets 13.

The tool 9 is fixed by its frame 18 at the end of the connecting rods 16a. The connecting rods 16a are connected by means of a pin 54 at end of the cylinder 31 mounted between the brackets 13.

In the rest position, the swing 25a and tool 19 assembly is carried by the cylinder 31 which is retracted. This assembly bears at the same time on the pulley 49 which is kept in the vicinity of one of the ends of the opening 48 by the rollers 50 which bear on the circular sectors 46.

Figure 5:
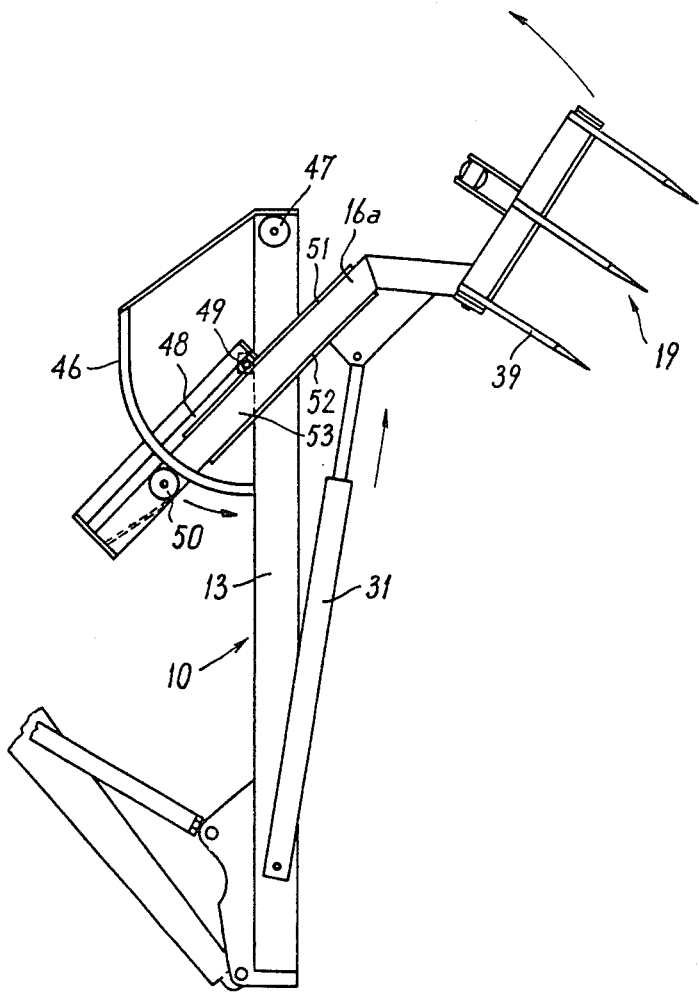

When the cylinder 31 starts being fed, as shown in FIG. 5, the effect is to tilt the connecting rods 16a which come to bear against the circular sectors 46 via the pulley 50, while being applied against the pulleys 49.

When the rollers 50 have covered the full length of the corresponding circular sector 46, they are brought, as shown in FIG. 6, against the inner face of the brackets 13. The connecting rods 16a are then in axial alignment with the brackets 13, so that the pulleys 47 carried by the brackets 13 enter the hollow rail 53, which makes that the connecting rods 16a are then guided both by the pulleys 47 and 49. By feeding the cylinder 31 further, the connecting rods 16a slide coaxially to the brackets 13, as shown by FIG. 7, while being guided by the pulleys 47 and 49.

As shown in the figures of this embodiment and in the same manner as previously described, the overhang length of the tool 19 is never increased but n the contrary reduced from the rest position to the highest possible position.

It is important to notice that the motion of the tool 19 between the positions shown in FIG. 6 and those shown in FIG. 7 is a sliding motion without any pivoting motion, which enables placing an article supported by the tool 19 with a great precision without having to operate the tractor loader.

This advantage is particularly beneficial for stacking bales or similar articles such as drums or casks which can be gripped by clamps replacing the tines of the tool described.

FIGS. 8 to 11 illustrate still another embodiment forming a development of the embodiment according to FIGS. 1 to 3.

As previously described, the brackets 13 support the connecting rods 16 of a swing 25a via their slanting segment 13a. Moreover each slanting segment 13a is extended by an upright segment 13b carrying a pin 55 for articulation of the head of telescopic connecting rods 56, each comprising a sleeve 56a and a mobile slide 56b. When the slide 56b is telescopically introduced in the sleeve 56a, the length of the connecting rods 56 is equal to the useful length of the connecting rods 16.

Each slide 56b of the telescopic connecting rods 56 is articulated on the pin 20 on which are also articulated the bases of the connecting rods 21 which are otherwise articulated on the pins 23 carried by the rocking lever 22.

At rest, and as in FIG. 1, the connecting rods 16 bear on the cross-piece 14a and the tool 19 is substantially horizontal.

When the cylinder 31 begins to be fed (FIG. 10), the rocking lever 22 pivots about the fulcrum 15 so that the connecting rods 21 are lifted, which causes tilting of the tool 19 about the pins 17 over an angle slightly greater than 90°, and drives the slides 56b into the sleeves 56a of the telescopic connecting rods 56. When the slides 56b are completely driven in, the sleeves 56a are in abutments, the tool 19 is tilted as shown by FIG. 10 and the connecting rods 56 have a useful length equal to that of the connecting rods 16, so that they form with the rocking lever 22 and the frame 18 of the tool 19 a perfect deformable parallelogram.

Figures 10, 11:
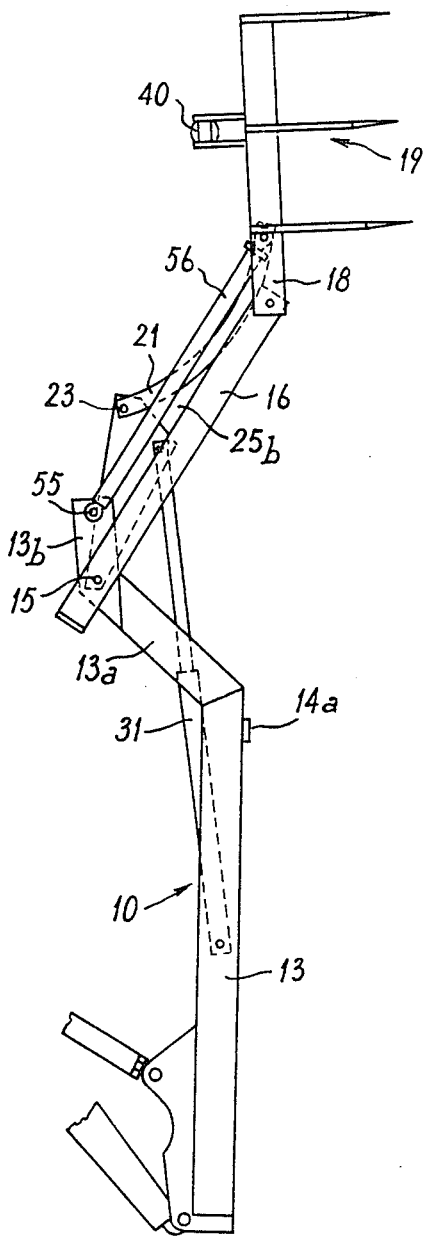
FIGS. 10 and 11 are elevation views, similar to FIG. 8, illustrating some characteristic states.

When feeding the cylinder 31 further, the hereabove described parallelogram is regularly deformed, the effect of which is to lift the tool 19 without its trim being modified, which is shown in FIG. 11.

The foregoing shows that the tilting motion of the tool 19 is carried out in the first place without an important elevation of the tool 19, then the lifting motion takes place without a modification of the angular position of the tool 19, which is particularly advantageous for handling fodder bales, drums, casks or other articles which have to be placed at the desired location without having to intervene on position of the loader 3.

The invention is not limited to the embodiments shown and described in detail, since various modifications can be carried out without departing from its scope. In particular, the length of the slanting segment 13a of the brackets and that of the connecting rods which are part of the swing can be chosen so as to grip and deposit articles directly on the ground by means of the tool 19, or any other tool which can be substituted to the tool 19.

We claim:

1. An elevator device for an agricultural tractor loader, said device being mounted in lieu of a tool which the loader usually comprises and including at least one bracket for the support of at least one mobile member connected to a tool, wherein the elevator device comprises a swing member bearing in an articulated manner on a member protruding from a bracket in direction of the tractor loader, said swing member being moreover supported and actuated by cylinder means connected to the bracket, whereby said swing member pivots the tool attached thereto and lifts said tool during expansion of the cylinder means, wherein the swing member comprises two connecting rods mounted between two brackets supporting a circular sector protruding toward the tractor and against which rolls at least one roller carried by the connecting rods of the swing member which define an opening through which passes a pulley carried by said brackets which support therebetween the tilting and lifting cylinder means connected to said connecting rods, whereby expansion of the cylinder means causes tilting of the connecting rods by the rollers rolling on the circular sectors while the pulley forms a bearing point for said connecting rods.

2. The device as set forth in claim 1, wherein the connecting rods of the swing member define hollow rails, the brackets supporting pulleys at upper portion of the brackets, said pulleys entering the hollow rail of each connecting rod at end of a tilting motion of said connecting rods, whereby the connecting rods are guided simultaneously and axially by said pulleys.

3. The device as set forth in claim 1, wherein the connecting rods of the swing member are directly connected to the tool.

4. The device as set forth in claim 1, wherein the tool is formed by a gripping assembly comprising at least two pivoting arms mounted on a frame and actuated by a common cylinder for causing a pivoting motion of the arms according to an amplitude limited by two sets of end of travel abutments.

5. The device as set forth in claim 4, wherein the arms are provided with tines which are curved according to an arc of circle of a same length as length of said arms.

* * * * *

UNITED STATES PATENT AND TRADEMARK OFFICE
CERTIFICATE OF CORRECTION

PATENT NO. : 4,778,330

DATED : October 18, 1988

INVENTOR(S) : Mailleux et al.

It is certified that error appears in the above-identified patent and that said Letters Patent is hereby corrected as shown below:

Col. 1, line 21: delete "are" (second occurence) and substitute --and-- therefor;

Col. 5, line 12: change "n" (after "increased") to read --on--.

Signed and Sealed this

Fourth Day of April, 1989

Attest:

Attesting Officer

DONALD J. QUIGG

Commissioner of Patents and Trademarks